United States Patent [19]
Phillips et al.

[11] Patent Number: 5,186,122
[45] Date of Patent: Feb. 16, 1993

[54] SMALL ANIMAL LIVING ENVIRONMENT SYSTEM

[75] Inventors: Gerald A. Phillips, Wantagh; Chi-Liu Wu, Bayside; Marvin A. Goldman, North Hills; Jerome N. Goldman, New York; Terry I. Goldman, Lloyd Harbor, all of N.Y.

[73] Assignee: Penn-Plax, Inc., New York, N.Y.

[21] Appl. No.: 917,736

[22] Filed: Jul. 23, 1992

Related U.S. Application Data

[63] Continuation of Ser. No. 793,872, Nov. 18, 1991, abandoned, which is a continuation of Ser. No. 713,492, Jun. 12, 1991, Pat. No. 5,092,269.

[51] Int. Cl.⁵ .................................................. A01K 1/00
[52] U.S. Cl. .......................................... 119/15; 119/29
[58] Field of Search ...................... 119/15, 17, 19, 26, 119/29, 5

[56] References Cited

U.S. PATENT DOCUMENTS

| | | | |
|---|---|---|---|
| 3,742,908 | 7/1973 | Merino | 119/15 |
| 3,789,799 | 2/1974 | Orfei | 119/15 |
| 3,859,961 | 1/1975 | Willinger et al. | 119/15 |
| 3,865,082 | 2/1975 | Lovitz et al. | 119/15 |
| 3,958,534 | 5/1976 | Perkins et al. | 119/15 |
| 3,999,519 | 12/1976 | Rodemeyer | 119/15 |
| 4,723,512 | 2/1988 | Margolis | 119/15 |

Primary Examiner—John G. Weiss
Attorney, Agent, or Firm—Nikaido, Marmelstein, Murray & Oram

[57] ABSTRACT

A small animal living environment system formed from small animal enclosures fabricated from transparent thermoplastic material. The enclosures having a lid opening large enough to accommodate a human hand and ventilation openings of sufficient size and number to allow for air passage through the enclosure. The enclosures also have a plurality of through openings on the walls of the enclosure, for the passage of small animals therethrough and an attaching means formed at the opening passage for the attachment of tunnel tubes, and small animal living accessories. The attaching means is formed from a U shaped track system wherein an outside edge of the opening passage is formed into at least one U shaped channel on the lower portion of the opening passage, and tunnel tubes are formed with a protruding lip on the outside edge of the tube opening so that the lip may be securely fit into the channel of the U shaped track attaching means.

8 Claims, 6 Drawing Sheets

SMALL ANIMAL LIVING ENVIRONMENT SYSTEM

This application is a continuation of application Ser. No. 793,872 filed Nov. 18, 1991 now abandoned which is a continuation application under 37 CFR 1.60 of prior application Ser. No. 713,492 filed June 12, 1991 now U.S. Pat. No. 5,092,269.

BACKGROUND OF THE INVENTION

The present invention relates to an improved enclosure and environment habitat for use by home hobbyists to maintain and confine small animals such as hamsters, gerbils and mice. Small animal enclosures have been known and used in both the home and laboratory setting for any years. See for example; U.S. Pat. No. 3,791,346; 3,865,082; and U.S. Pat. No. 4,723,512. More particularly, the present invention provides a small animal environment with advantageous features which make it easier to maintain and more fun for the home hobbyist to keep these animals.

It is commonly known that home hobbyists enjoy the ability to connect an assortment of enclosure modules and accessories, such as exercise wheels and feeders, to a main enclosure unit. Such a feature provides the hobbyist with the ability to customize the animals home into interesting and aesthetically pleasing configurations. This feature also allows the animal to move more freely through an enlarged environment and to encounter a variety of challenges to enhance exercise and well being. Further, the ability to attach a plurality of enclosures together makes it easier to keep multiple animals in a comprehensive small animal environment. A problem arises with such a system when it is necessary to clean certain enclosure modules or accessories, or to confine different animals to separate areas of the small animal environment. The present invention while allowing for ease of combination of various habitat components also provides the ability to selectively close off or open any of the connections in order to segregate various parts of the animals environment without disassembling the component parts.

It is also known that since animals such as hamsters and gerbils are naturally tunneling animals it is beneficial to provide these habitats with tunnel like pathways and connections. See for example U.S. Pat. No. 3,859,961. The present invention, by utilizing a uniquely shaped tube and opening connection arrangement allows the home hobbyist to create more naturally configured tunnels, which are also more pleasing aesthetically, and more exciting for watching the animals roam and explore.

The present invention also allows for more living space for the animal. Due to the ease of attachment of accessories and the ability to close off each opening without detaching the accessories, all feeding and play additions may be placed outside of the living area allowing more utilizable space in the enclosure itself.

SUMMARY OF THE INVENTION

It is an object of the present invention to provide a small animal environment which allows ease of use for the home hobbyist. It is a further object of the present invention to provide a small animal environment which allows easy connections of tunneling tubes, accessories, and additional housing modules. It is a still further object of the present invention to provide a small animal environment that will allow for easy segregation of the various parts of a living environment, without the necessity to detaching accessories or additional housing modules. It is another aspect of the present invention to provide a small animal environment that allows for more natural and aesthetically pleasing tunnel designs which can be easily arranged and altered by the home hobbyist.

The present basic unit invention is one or more connectable small animal enclosures fabricated from a transparent thermoplastic material. This material can be tinted to various degrees to provide a better appearance or to darken the enclosure as a sleeping or breeding area. The size of the individual enclosure can vary depending upon the number of animals it is intended to house. Common sizes of units known in the art would provide internal space in a range that would equate to a volume of between 1 and 10 gallons of liquid. The specific dimensions of the enclosure can vary in providing this volume, but it is preferable to maximize bottom space and front viewing area. Since these units are combinable the hobbyist can expand living space by simply adding extra enclosures or modular units. The enclosure must have adequate ventilation openings for air passage. These openings must be sized and situated so that they do not provide an edge for the animal to gnaw. The enclosures should not have exposed edges or internal corners to reduce the chance of gnawing.

The enclosures are provided with a lid opening large enough to accommodate a hand for the hobbyist to have access to the inside living area. It is preferable for the enclosure to have an open bottom which is fitted with a mesh or wire grid floor. A bottom litter tray may then be removably attached to the enclosure, below the grid floor. Litter, such as pine shavings can be placed in the litter tray and animal droppings fall through grid into the tray. The tray may then be removed for cleaning.

The small animal enclosure is also provided with a plurality of through openings on the side walls for the passage of small animals. These are attachable to tubes, other enclosures, and various accessories such as exercise wheels, feeders, and water bottles. The through openings must be of sufficient size for an animal such as a hamster to crawl through, approximately 1 to 4 inches in diameter.

The present invention provides a unique through opening arrangement which utilizes a U shaped double track system rather than the conventional snap in or screw in systems known in the art. This system offers the beneficial advantages of allowing the hobbyist to easily combine different components of the small animal environment, while offering the ability to close off these components without disassembling the connections.

The outside edge of the opening is formed into two U shaped channels or tracks on the lower portion. The inside track, closest to the enclosure, accommodates a door slider or stopper. The outside track accommodates connections for tubes, other enclosures, and accessories. The tubes and accessories are formed with a lip on the outside edge which may be securely fit into the outside track. It is preferable if a flange is provided on the lip of the tube or accessory, and this flange fits into a receptacle formed in the track. When thus engaged the flange and receptacle keep the tube and accessory from twisting out of place.

The door slider stopper, when placed in the inside track, can close off the passageway allowing the hobbyist to isolate various portions of the housing environment. This is useful for cleaning and maintaining the units, and when there is a necessity to keep different animals separate from each other. It is preferable if the door slider stopper is formed so that if it is placed in the inside track one way it closes the through hole and if placed in another way it opens the throug hole. In this manner the door slider is engaged when the through hole is opened or closed and will not be lost by the home hobbyist. It is more preferable if the closed end of the slider is provided with air holes or slits which will aid in ventilation of the unit when it is closed.

It is also preferable if the entire through hole is covered by a metal protector, made of a durable material, such as a stamped steel on the inside edge surface of the hole. Small animals such as hamsters and gerbils will gnaw at any exposed plastic edges and eventually eat large openings in the enclosure. The metal protector should cover all exposed plastic edges formed by the through hole in order to provide a surface resistant to gnawing.

The small animal enclosure may also be provided with through opening on the top surface of the unit. These opening are used in conjunction with straight tubes which extend therethrough, to a point within the enclosure which would allow the small animal to climb into the tube. Such tubes are usually provided with a small enclosure or tower top at the upper end for the animal to climb into. In one embodiment of the present invention a small enclosure is provided at the top of such a tube, and the small enclosure is provide with a flip top lid. This lid is formed so that when it is flipped open it provides a unique standing platform for the small animal to climb on. This feature provides desired interaction between the hobbyist and the animal.

The present invention may also be provided with a uniquely shaped quarter round tube which is attachable to the enclosure at the through hole using the outside track of the through hole and a lip on the tube. The quarter round tube may be combined using linking rings generally formed from a pliable plastic material. The linking of quarter round tubes allows for realistic twists and turns to be formed to simulate natural small animal tunnels. This shape allows for the formation of loops and spirals for the small animal to play in adding more enjoyment for the hobbyist. A quarter round tube may also be provided with a through opening in the wall of the tube to form a Y shaped tube passage. When the Y tube is joined with three quarter round tubes, a full circle is formed. This can be attached to the housing enclosure by interlocking the side wall passage of the Y tube to the outside track on the enclosure through hole.

Moreover, in one embodiment of the present invention the small animal enclosure is formed with through openings on two adjacent walls which are spaced in a relationship that allows the two openings to be joined by three connected quarter round tubes. This forms a runway for the animal that leads out of the enclosure from one side and reenters the enclosure from the second side after following a three quarter circle path. Such an arrange allows the animal exercise space without taking up much room, and provides an exciting viewing experience for the hobbyist.

Further, the quarter round tubes may be used to form a top arch tunnel, also beneficial for animal play and exercise. Through openings on top of the enclosure may be spaced in such a manner that when the outside ends of the straight tube passageways are joined to two connected quarter round tubes, an arched passageway is formed. The small animal may then crawl up a straight tube on one side, out of the enclosure, through the arched quarter round tubes, and back down the second straight tube to reenter the enclosure. Both of the arrangements, which are facilitated by the use of the present unique quarter round tubes and the spacial relationship of the enclosure's through holes, offer the appearance of giving the animals freedom of movement and running room while keeping them safely confined in the housing environment.

BRIEF DESCRIPTION OF THE DRAWINGS

The above and other objects and advantages of the present invention will become readily apparent by reference to the following detailed description when considered in conjunction with the accompanying drawings wherein.

Like reference numerals refer to like parts throughout the several views of the drawings.

DETAILED DESCRIPTION OF THE INVENTION

Figure 1:
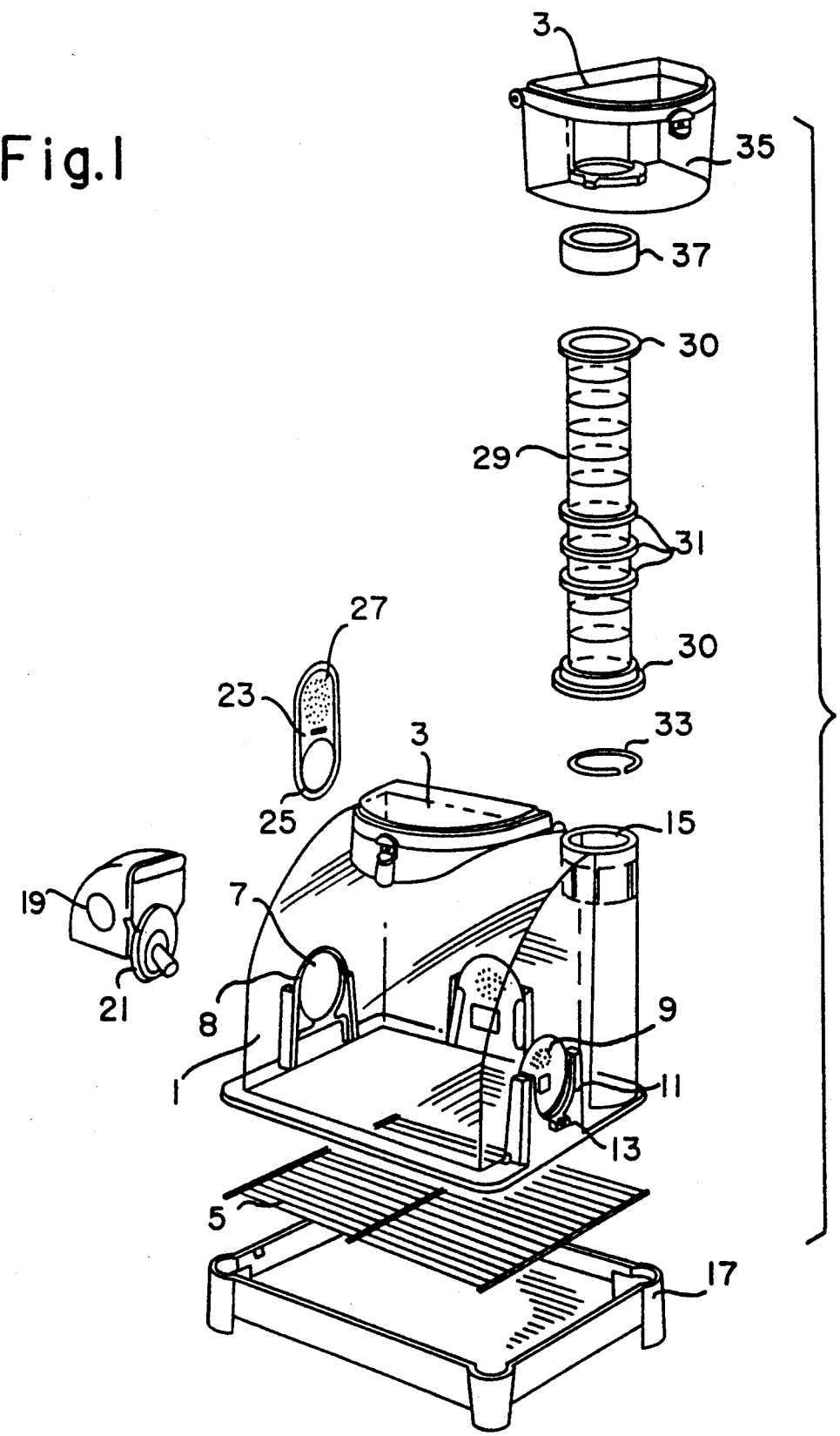
FIG. 1 is an exploded view of a simple small animal environment illustrating an embodiment of the present invention.

FIG. 1 shows an exploded view of a simple small animal environment according to the an embodiment of the present invention. The main small animal enclosure 1 is provided with a flip top lid opening 3 at the top of the enclosure. A wire grid floor 5 fits onto the open bottom of the enclosure 1. Side wall through holes 7 are formed on the two side and back walls of the enclosure. Two of the through holes 7 ar closed off with vented door closures 9. A U shaped double track 11 is formed on the outside wall around the through holes 7. A metal protector 8 slides over the exposed edge of the through hole. A flange receptacle 13 is formed at the bottom of the U shaped track 11 on the outside track. A single top wall through hole 15 is formed on the side of the lid opening 3.

The small animal enclosure 1 the little tray 17 at the opened of the enclosure. A water bottle 19 is formed with a bottom U shaped bead 21 to engage an outside track of the U shaped double track 11. A door slider 23 is formed with an opened end 25 and a closed end with air holes 27. A straight tube 29 is formed with variably spaced outside beads 31. When the straight tube 29 is inserted into the top wall through hole 15, the beads will hold it at a desired height above the wire grid 5. A metal ring 33 may be fitted over the inside end of the straight tube to resist gnawing. A tube lip 30 is provided at the ends of the tube to facilitate engagement with the outer track of the U shaped double track 13. At the top of the straight tube 29 a tower top 35 is attached using a linking ring 37. A flip top lid opening 3 is hinged onto the tower top 35.

Figure 4:
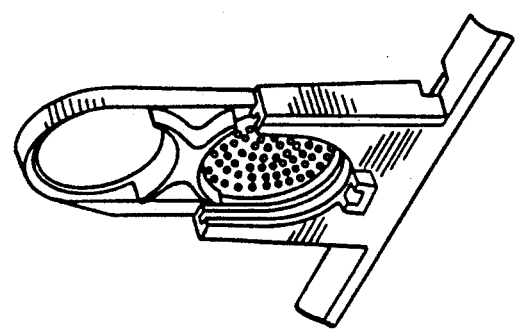
FIGS. 2, 3 and 4 are cutaway views of a side wall of an animal enclosure illustrating the double track system of the present invention, and how sliding door closures can easily open and close passageways without disassembling attached component parts.
Figure 3:
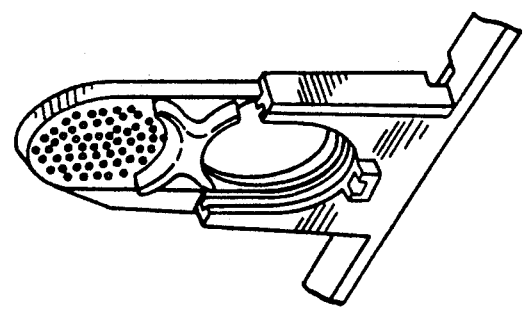
Figure 2:
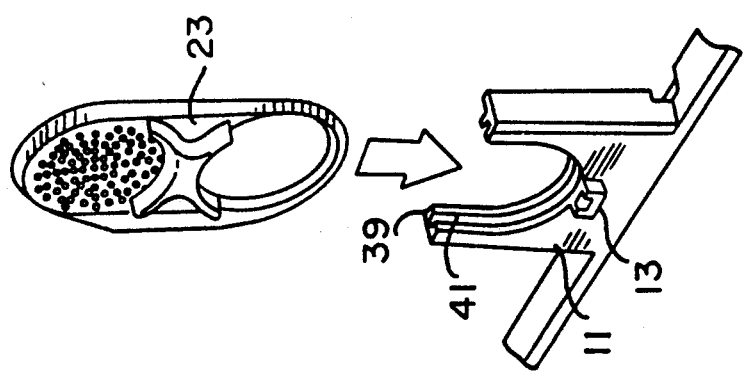

FIG. 2, 3 and 4 illustrates the U shaped double track system 11 of the present invention and the use of the door slider 23 to open and close the passageway. The inside track 39 accommodates the door slider 23, while the outside track 41 joins tubes, accessories or other housings. FIGS. 3 and 4 illustrate the door slider 23 in place in the inside track 39. In FIG. 3 the open end of the door slider 25 is engaged and in FIG. 4 the passage is closed off when the closed end of the door slider 27 is engaged. It is readily apparent that the door slider engages and disengages from the inside track without any effect on the outside track. A passageway can therefore be closed or opened without disengaging any tube or accessory which is engaged in the outer track 41.

Figure 5:
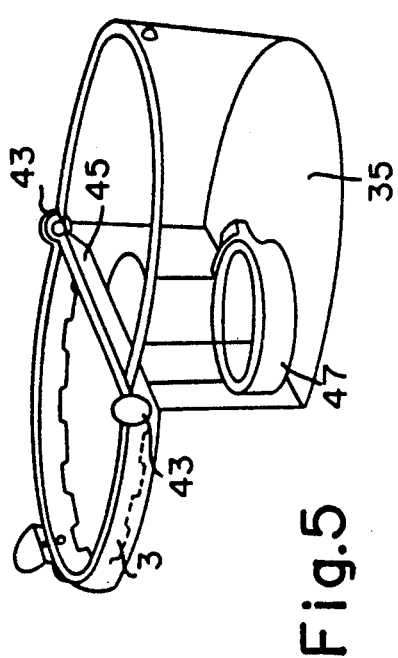
FIG. 5 is a perspective view of a tower top according to the present invention with the flip top lid in an opened position.

FIG. 5 illustrates a tower top 35 of the present invention with an open flip top 3. The flip top 35 is hinged to the bottom portion of the tower top at the back end 43. Both the back edge of the flip top 3 and the top back of the tower top 35 are slanted so that the edges act as a stop to keep the flip top level when opened. A small animal can sit o this opened flip top for play with the hobbyist. The inner surface of the lip may be formed with bumps or runners to keep the animal from slipping on the plastic surface. The tower top 35 engages a tube at the bottom opening 47.

Figure 6:
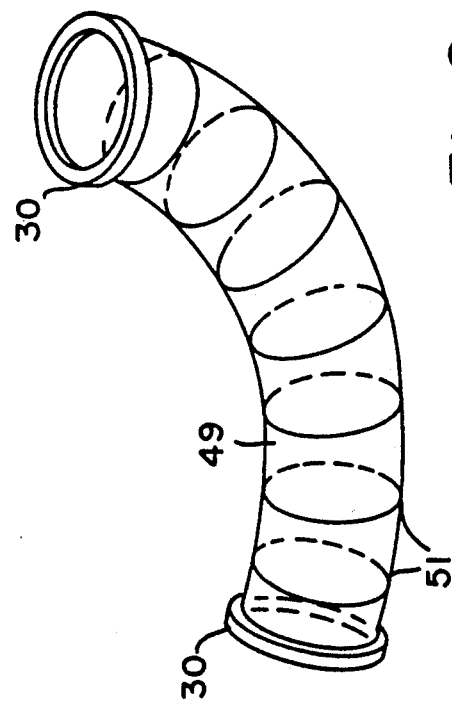
FIG. 6 is a perspective view of a unique quarter round tube used in embodiments of the present invention.
Figure 7:
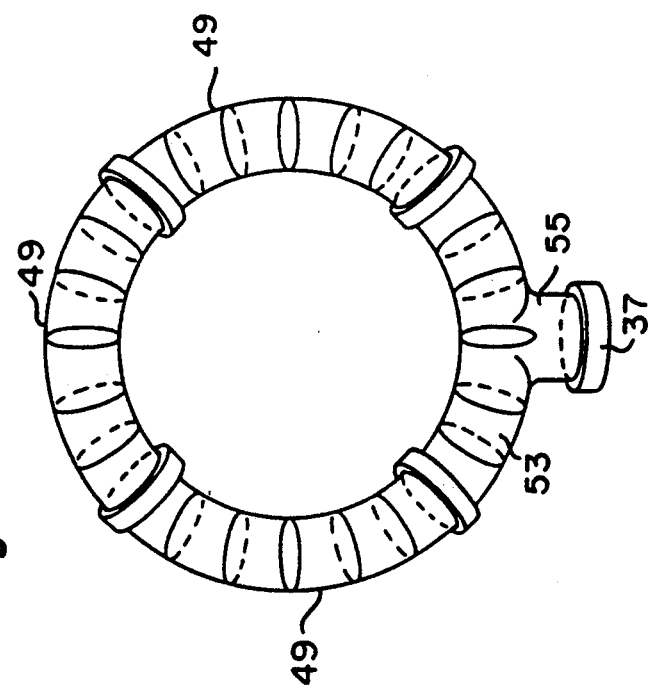
FIG. 7 is a tube ring formed from three quarter round tubes and a Y tube.

FIG. 6 illustrates the quarter round tube 49 of the present invention. Linking lips 30 are provided at either ends to allow engagement with the double track system o linking with other tubes using linking rings. Internal ridges, 51 may be formed on the inner surface of the tube to aid the animal in moving through the tube. FIG. 7 illustrates three quarter round tubes 49 connected using linking rings 37 with a Y tube 53 to form a circular passageway. The Y tube 53 has a through opening on the side wall 55. The circular passage can be joined to other tubes or directly to an enclosure using this passageway.

Figure 8:
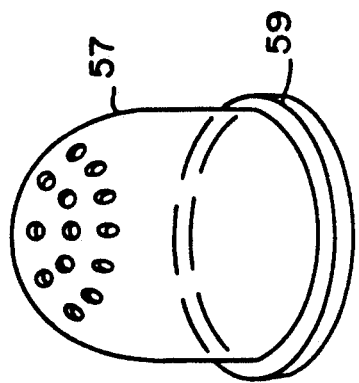
FIG. 8 illustrates a bubble cap.

FIG. 8 shows a bubble cap closure 57 which can be used to close off a top through hole or passageway from an enclosure. The lip 59 engages with the outside track of the U shaped double track side wall opening. A linking ring can be added to the lip to facilitate connection with the end of a tube, or for closing off a top through hole. The bubble cap is shaped to protrude out from the passageway so that a small animal can crawl into the cap. This provides added viewing variety for the hobbyist.

Figure 9:
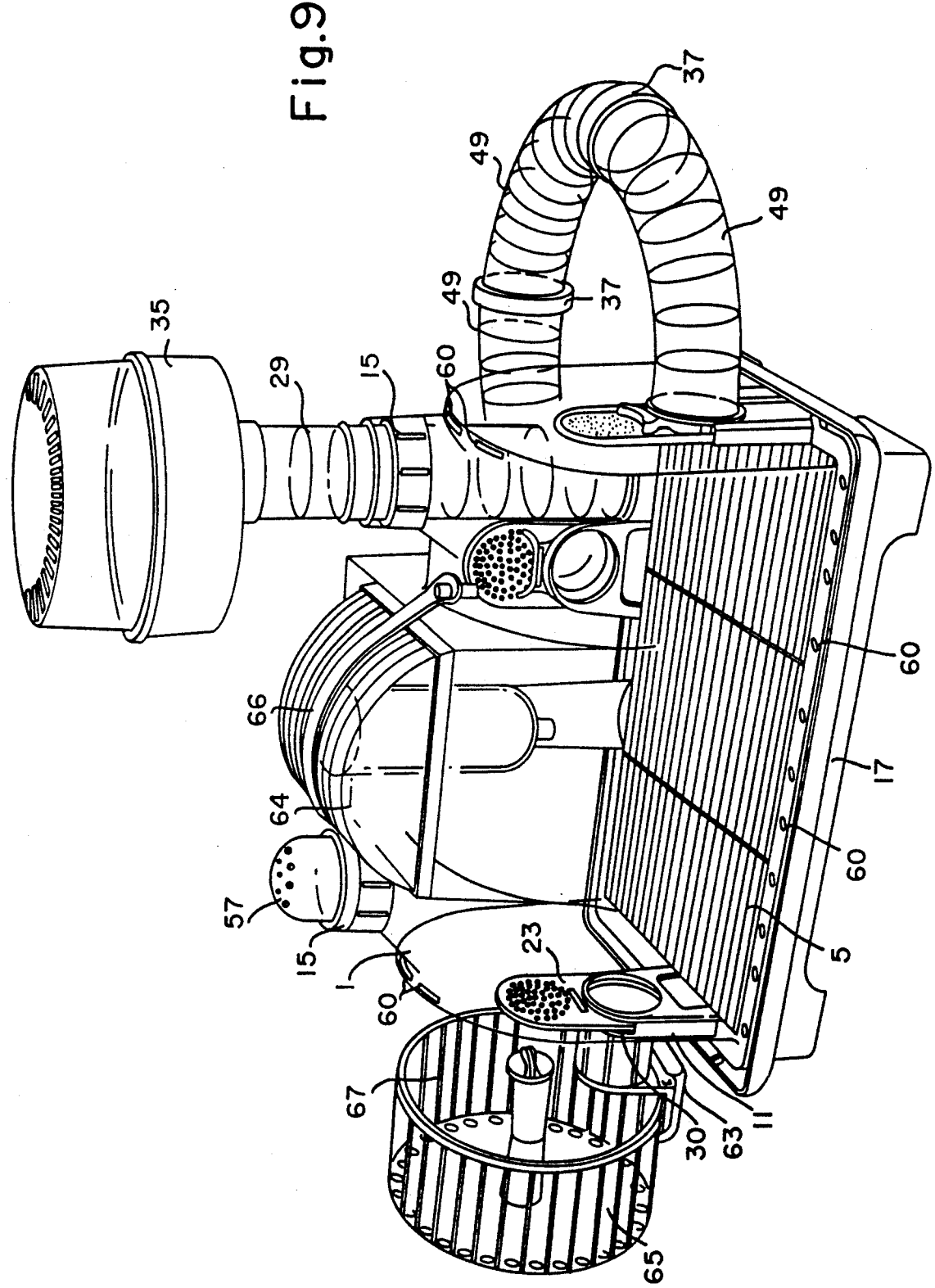
FIG. 9 is a perspective view of a small animal enclosure according to an embodiment of the present invention.

FIG. 9 illustrates a small animal environment of the present invention with a plurality of attached accessories and tubes. The enclosure 1 has a wire grid floor 5 and litter tray base 17. A bubble cap closure caps off an unused upper wall through hole 15. A straight tube 29 extends through a second upper wall through hole 15. A tower top 35 connects at the top of the straight tube. In this embodiment the tower top is a conventional unit without the novel flip top platform of the present invention. Also the enclosure lid 64 is not of the flip top type, but is full removable and secured in place by a lid band 66. Air vents 60 are spaced throughout the enclosure 1 to provide adequate ventilation.

An exercise wheel 61 having a linking lip 30 engages the outside track of a U-shaped double track 11 at one passageway. A door slider in the open position is engaged in the inner track. The wheel has a unique removable waste catcher 63 that is slidably mounted at the bottom of the wheel. The outer wheel housing is slanted away from center so that animal droppings fall to the outer edge at the bottom of the wheel the waste falls into the waste cup 63 through a gap between the outer wheel housing 65 and the inner wheel housing 67.

This embodiment of the present invention also illustrates the unique relationship between the quarter round tubes and through hole passageways of the present invention. Three quarter round tubes are connected with linking rings 37 to form a three quarter circle runway. One tube end is engaged in the outside track of a U shaped double track system on one side wall, and the tube opposite tube end engages the double track system of an adjacent wall. The key inventive feature of this aspect of the present invention is the relationship between the three quarter circle formed by the quarter round tubes and the spacing of the through holes on the adjacent side walls. The through holes must be spaced so that they align with the circumference of the three quarter circle pathway formed by three connected quarter round tubes, at points equating to three quarters of a completed circular pathway that would be formed by four quarter round tubes. In this manner the opposing opened ends of the three quarter circle pathway can engage the through hole connections on the adjacent walls.

Based upon this aspect of present invention, the small animal an then provide with an exercise path that exists and enters that enclosure, yet takes up an minimum of space and keeps the animal securely in the small animal environment. The hobbyist is provided with an excellent opportunity to view the animal at play. Furthermore, door sliders 23 are engaged on in both inside tracks of the two passageways. These door sliders can be reversed in order to close off the runway for cleaning, maintenance or when the hobbyist wants to reconfigure the environment.

Figure 10:
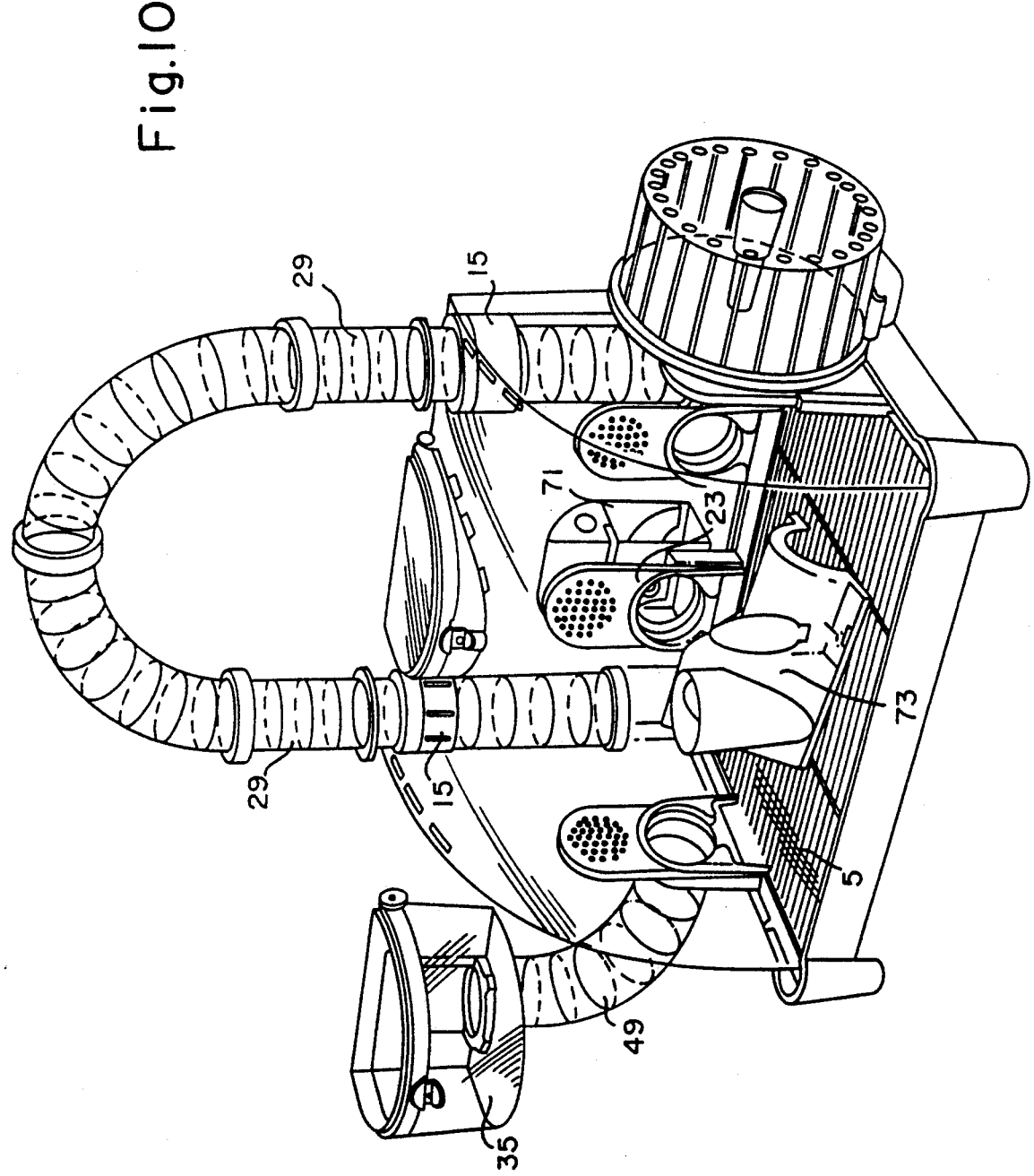
FIG. 10 is a perspective view of a small animal enclosure according to an embodiment of the present invention.
Figure 11:
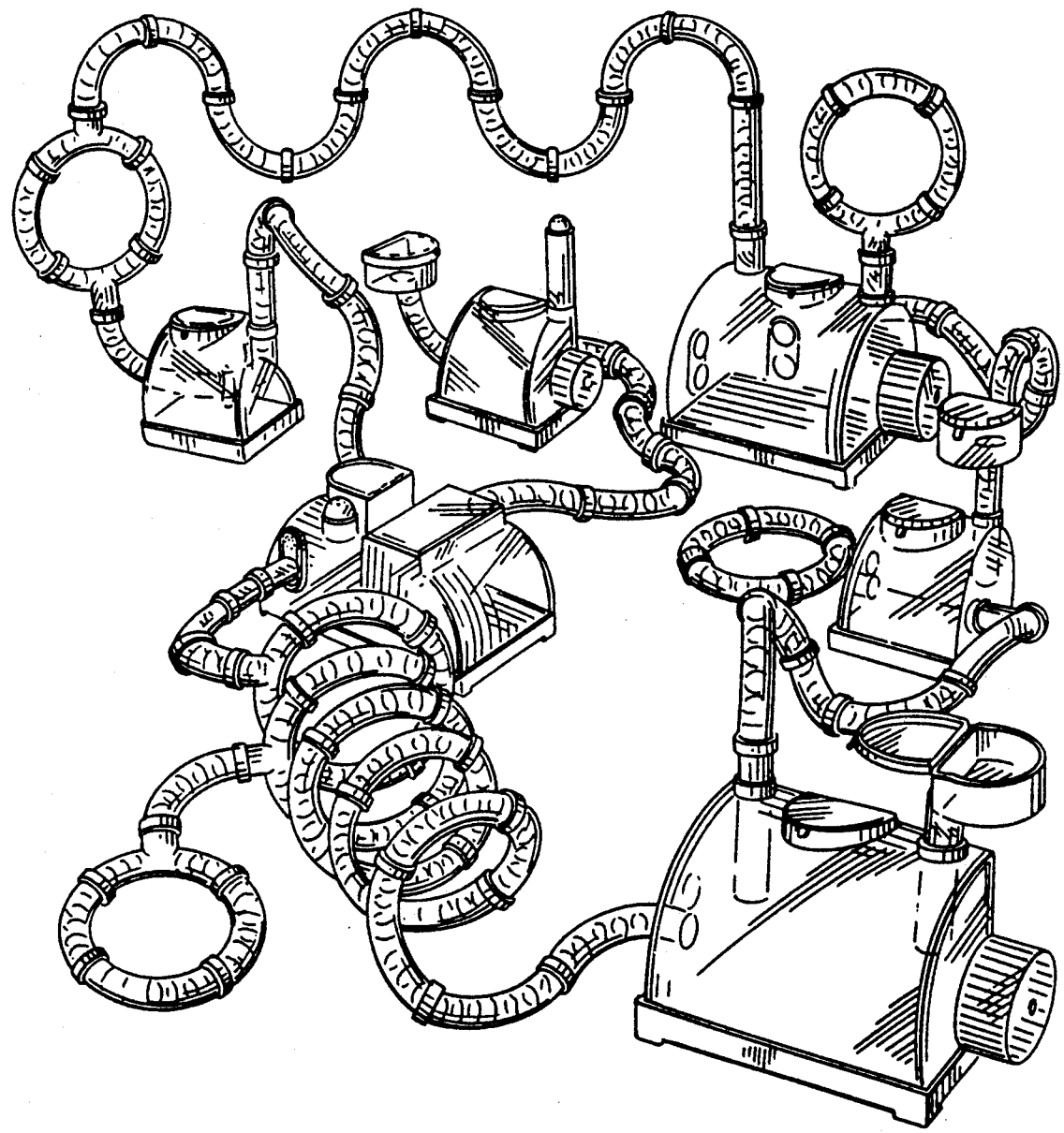
FIG. 11 is a perspective view of a small animal environment according to the present invention.

FIG. 10 illustrates an alternate embodiment of the present invention. In this embodiment and outside feeding accessory 71 is engaged at one passageway. The door slider 23 allows the hobbyist to close off the passageway to regulate feeding, and to remove the feeder for cleaning. The outside feeder also does not use valuable interior living area. A tower top 35 is connected to a quarter round tube and extends for a side passageway. An item of small animal furniture 73 is visible inside the enclosure. This furniture is uniquely designed to lock onto the wire grid floor 5 to prevent movement inside the enclosure. The preferable locking mechanism is to form undercut projections at the bottom of the furniture item that can hook onto the wires of the floor grid.

This FIG. illustrates the relationship that can be developed between the top wall through holes and the quarter round tubes to form an arched passageway above the enclosure. Two upper wall through holes 15 are spaced on the top wall of the enclosure 1 so that when straight tubes 29 are extended through these through holes the top ends of the straight tubes can be joined together by two quarter round tubes. The upper through holes 15 must be spaced so that they align with the circumference of the half circle pathway formed by two joined quarter round tubes, at points equating to one half of a completed circle that would be formed by quarter round tubes. This feature of the present invention offers the unique advantages for small animal care and enjoyment discussed above relating to the three quarter round pathway. In addition, this arrangement allows the small animal to simulate free climb up out of the enclosure and back down into the enclosure while being securely confined in the hamster environment.

FIG. 12 illustrates a complete multi enclosure small animal environment. This environment can house multiple small animals in the various enclosures. The configuration is facilitated by the ability to easily connect tubes and accessories using the U shaped double track system, and the ability to close off various component parts using door sliders. The use of quarter round tubes offers the ability to form more natural and pleasing tunnel assemblies to promote exercise for the small animals and enjoyment for the hobbyist.

It is readily apparent that the above described small animal environment meets all of the objectives mentioned as well as providing other advantages for maintaining small animals. It should be understood that the specific form of the invention here and above described is intended to be representative only, as certain modifications within the scope of these teachings will be apparent to those skilled in the art of small animal care.

Accordingly, reference should be made to the following claims in determining the full scope of the invention.

What is claimed:

1. A small animal living environment system comprising:
   at least one connectable small animal enclosure fabricated from a transparent thermoplastic material;
   a lid opening, large enough to accommodate a human hand, formed in said enclosure;
   ventilation openings of sufficient size and number to allow for air passage through the enclosure;
   a plurality of through openings on walls of the enclosure, for passage of small animals therethrough; and
   attaching members integrally formed at each through opening for direct attachment of tunnel tubes and small animal living accessories,
   wherein two of said through openings are formed on adjacent walls of said enclosure in a spacial relationship so that a three quarter circle pathway can be directly attached to said attaching members which are internally formed at said two through openings.

2. A small animal living environment system according to claim 1, wherein said three quarter circle pathway is formed from said tunnel tubes.

3. A small animal living environment system according to claim 2, wherein said tunnel tubes include tubes shaped as a quarter round tube and said three quarter circle pathway formed from three quarter round tubes.

4. The small animal living environment system of claim 1, wherein a second attachable enclosure is connected to the first enclosure, the second enclosure further comprising a flip top lid formed so that the lid is in an open position, the flip top lid forms a standing platform which can support a weight of a small animal.

5. The small animal living environment system of claim 1, further comprising opening passage on a top wall of the enclosure, the opening passages being spaced in a relationship that allows two connected quarter round tubes to form an arched passageway between the opening passages when the quarter round tubes are engaged with the opening passages.

6. A small animal living environment comprising:
   at least one connectable small animal enclosure fabricated from a transparent thermoplastic material;
   a lid opening formed in said enclosure large enough to accommodate a human hand;
   ventilation openings of sufficient size and number to allow for air passage through the enclosure;
   a plurality of through openings on walls of the enclosure, for passage of small animals therethrough;
   an attaching member integrally formed at the through openings for direct attachment of tunnel tubes thereto, and for attachment of small animal living accessories; and
   opening passages on a top wall of the enclosure, the opening passages being spaced in a relationship that allows a half circle pathway to be connected to said opening passages to form an arched passageway between the opening passages.

7. A small animal living environment system according to claim 6, wherein said half circle pathway is formed from said tunnel tubes.

8. A small animal living environment system according to claim 7, wherein said tunnel tubes include tubes shaped as a quarter round tube and said half circle pathway formed from two quarter round tubes.

* * * * *